Sept. 10, 1940.  G. W. WATTS  2,214,711
PIPE STILL
Filed Feb. 2 1928  5 Sheets-Sheet 1
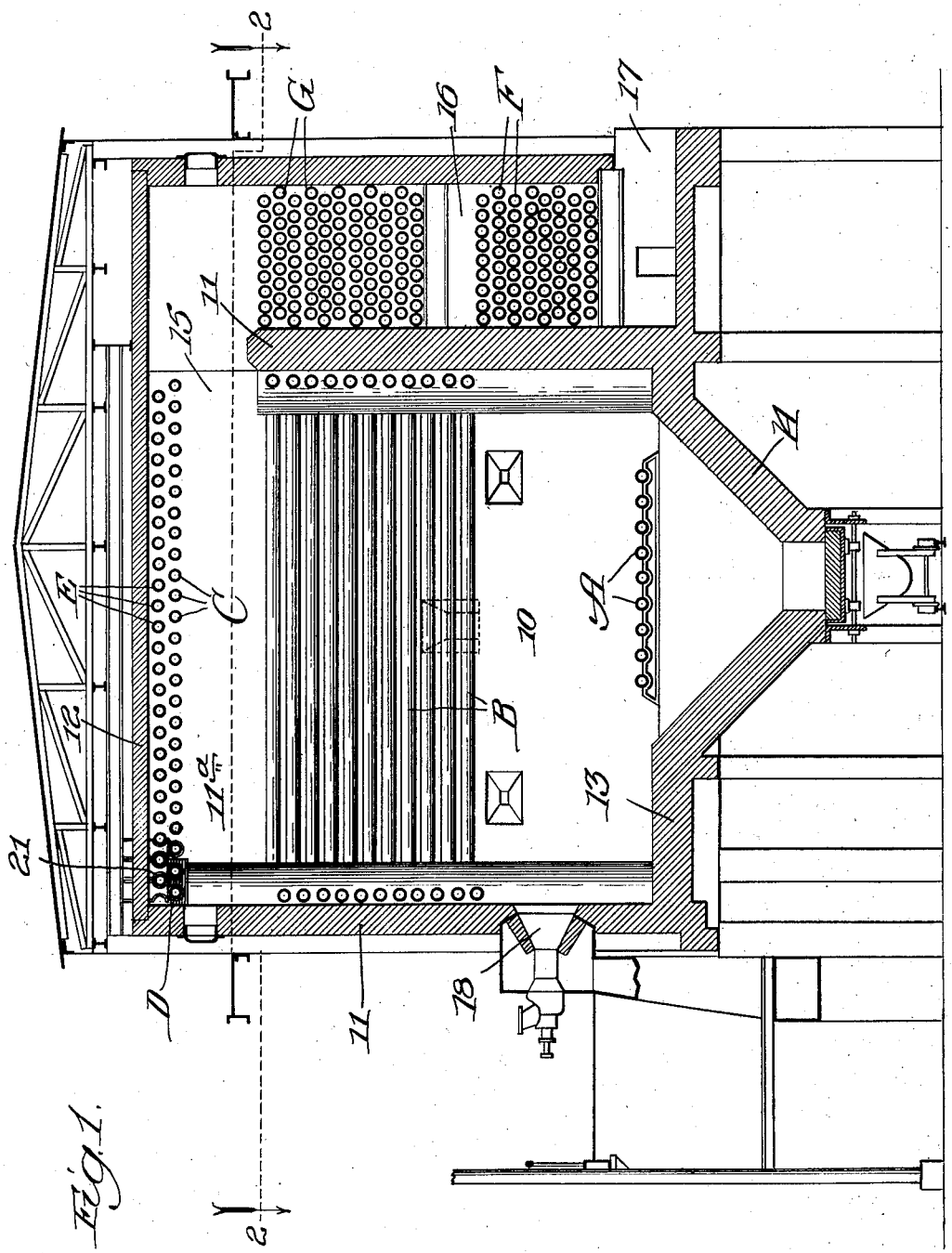

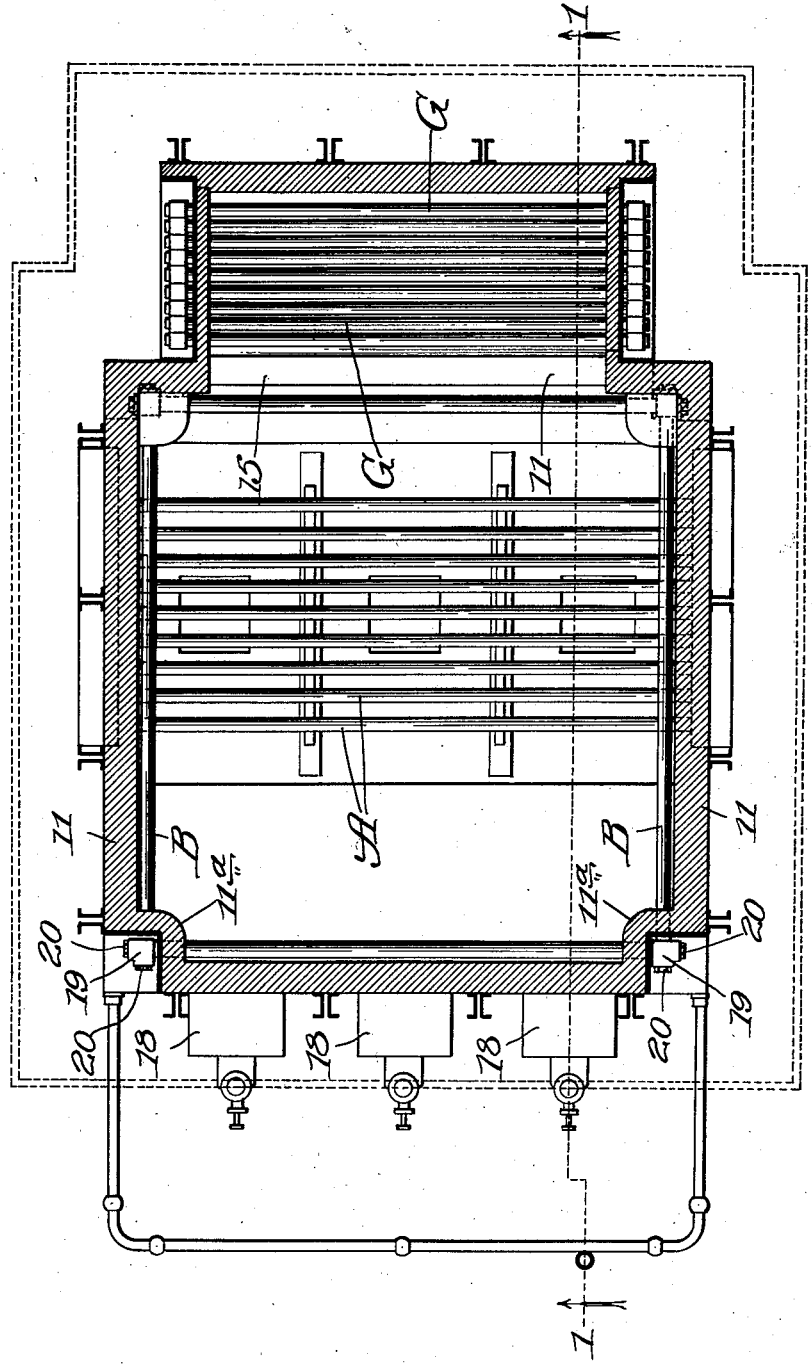

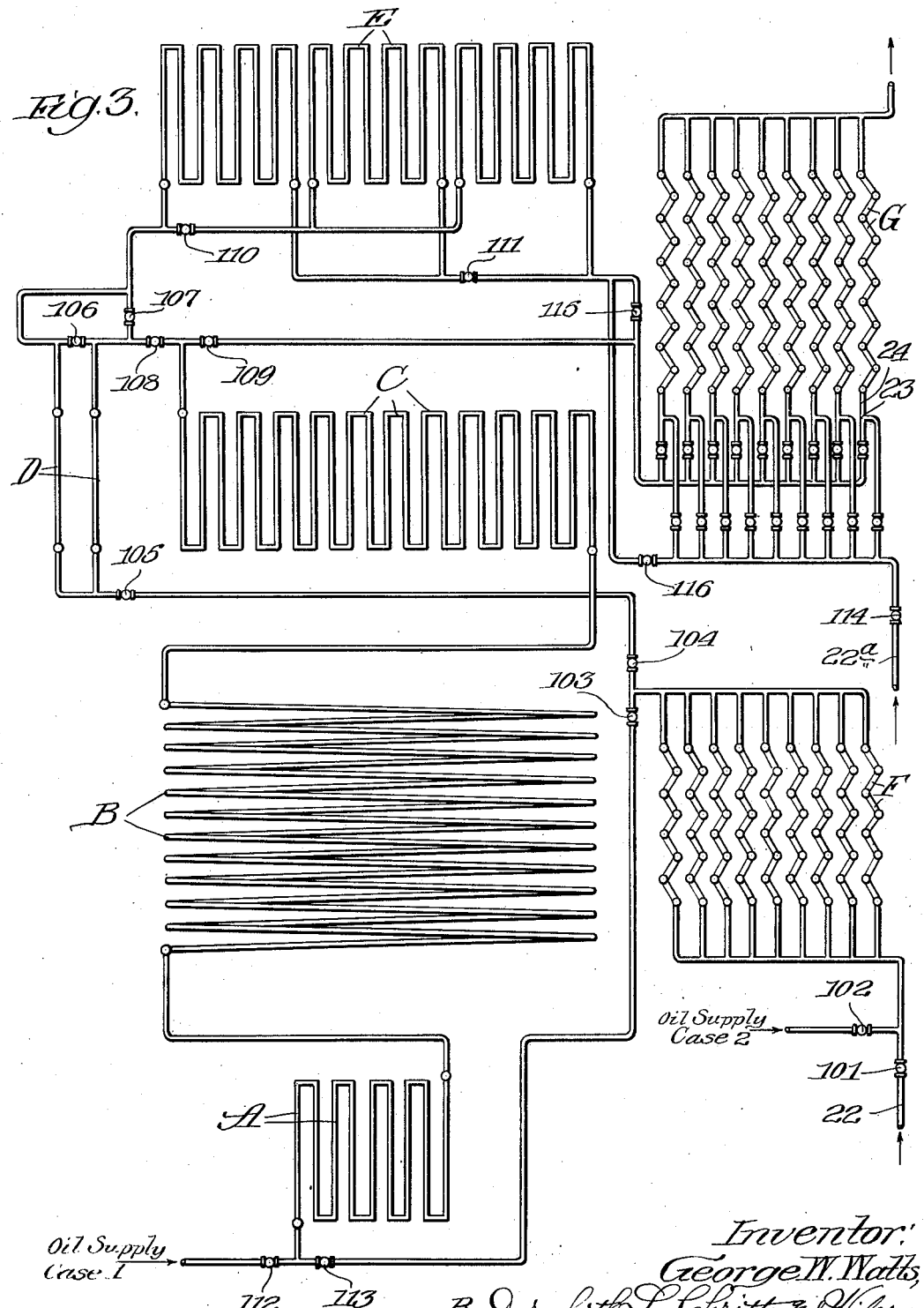

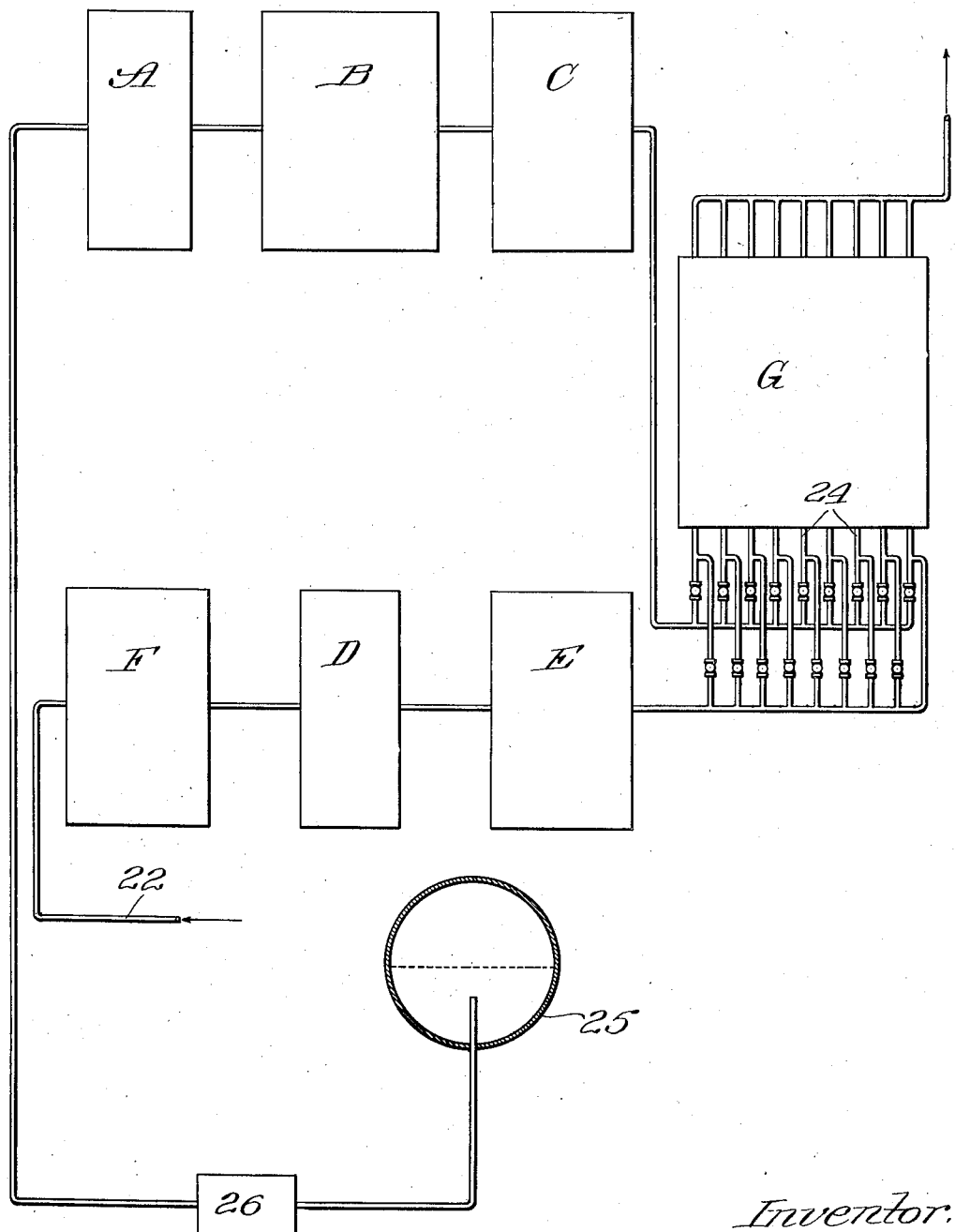

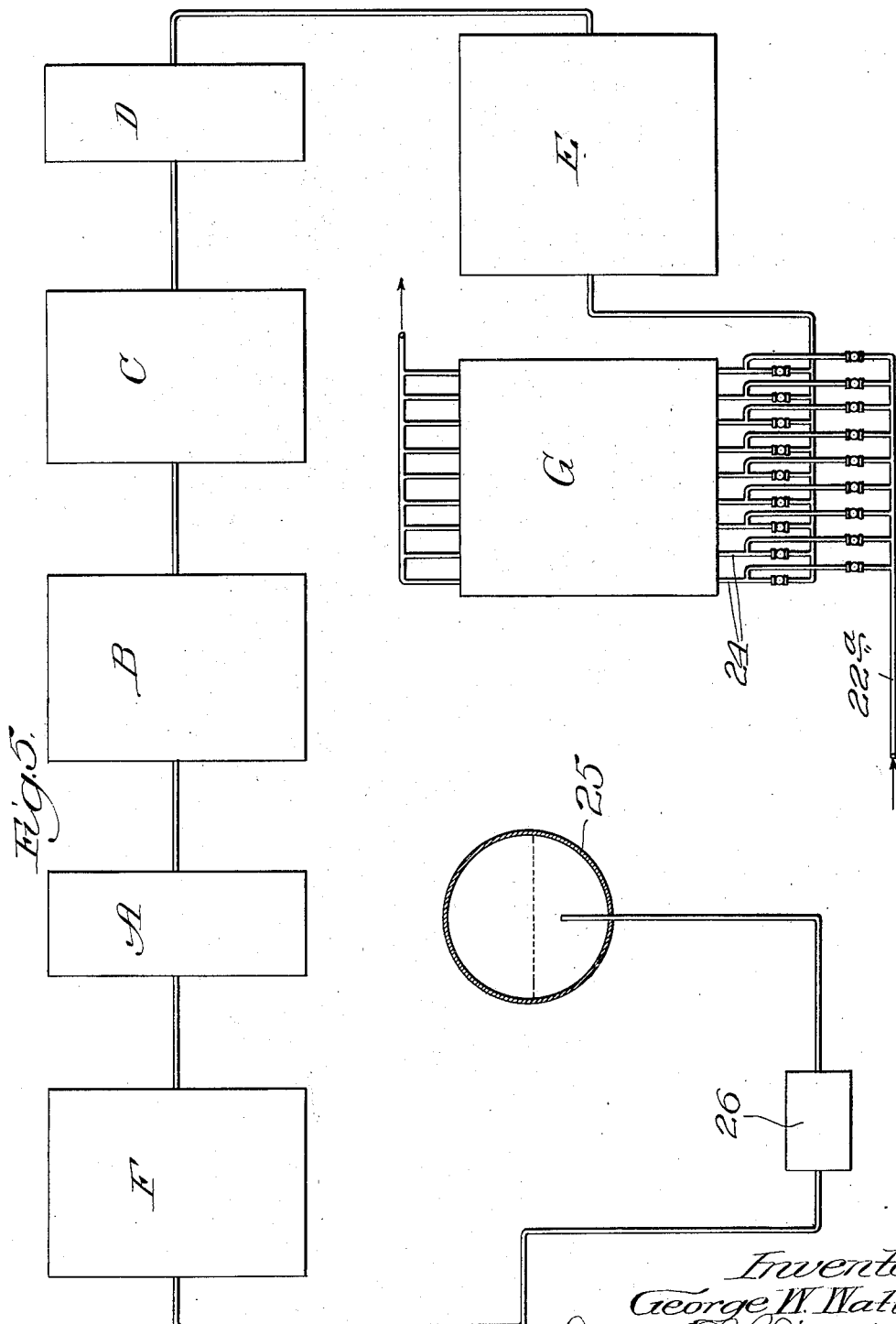

Patented Sept. 10, 1940

2,214,711

UNITED STATES PATENT OFFICE

2,214,711

PIPE STILL

George W. Watts, Whiting, Ind., assignor to Standard Oil Company, Whiting, Ind., a corporation of Indiana Application February 2, 1928, Serial No. 251,309

20 Claims. (Cl. 196—110)

This invention relates to improvements in pipe stills and is herein shown as embodied in a pipe still especially adapted for the treating of oil. Among the features of my invention is the provision of oil pipes and connections with valves permitting the use of the still in more than one way.

I have also provided means for introducing steam into the oil pipes to assist in the distillation, and means for superheating the steam if desired.

Other features and advantages of my invention will appear more fully as I proceed with my specification.

In that form of device embodying the features of my invention shown in the accompanying drawings, Fig. 1 is a vertical sectional view taken as indicated by the line 1—1 of Figure 2, Fig. 2 is a horizontal sectional view taken as indicated by the line 2—2 of Figure 1, Fig. 3 is a diagrammatic view of the pipes, connections and valves, Fig. 4 is a diagrammatic view showing the flow when the still is used in one way and Fig. 5 is a similar view showing the flow when the still is used in another way.

As shown in the drawings, the pipe still comprises a substantially cubical combustion chamber 10, enclosed by suitable walls 11 made of firebrick or other material, with a similar roof 12 and bottom 13 with a sloping ash pit 14. At one side the combustion chamber 10 is provided with an outlet 15 for the products of combustion leading to the passage 16, such products of combustion adapted to escape from the lower end of the passage 16 through the outlet 17 to a suitable stack (not shown).

18, 18 indicate three burners or burner tubes, of any well known construction adapted for the use of gas, oil, powdered coal or other suitable fuel. The details of such burners form no part of the present invention and need not be described in detail here. It will suffice to say that these burners are adapted to inject the burning fuel into the combustion chamber 10 in the usual manner.

In Figs. 1 and 2 I have shown oil tubes as they are arranged in the still. In these figures, however, I have not attempted to show the connections and valves for these tubes as that would obscure the drawings. Such connections and valves, however, are clearly shown diagrammatically in Figs. 3, 4, and 5.

In the still there are seven banks or groups of oil tubes indicated by A, B, C, D, E, F, G, respectively.

Bank A comprises nine tubes in series, referred to as the hearth bank and located at the bottom of the combustion chamber above the ash pit 14.

Bank B comprises eleven loops of tubes in series near the side walls of the combustion chamber 10. These eleven loops form one continuous helical or spiral coil surrounding the combustion chamber. The pipes of bank B are spaced a short distance from the walls 11 and such walls are preferably provided with reentrant angles at the corners so that the ends of the pipes B where they are connected together lie outside of the walls. Such connections may be seen by reference to Fig. 2 where the elbows are indicated by the reference numeral 19. The elbows 19 are really crosses, the outer openings being closed by plugs 20. Locating the joints outside the walls 11 prevents undue heating of the connections and also permits access to the interior of the tube by removing plugs 20.

Bank C comprises the lower roof row (with the exception of two tubes at the left as viewed in Fig. 1), consisting of twenty-three tubes in series.

Bank D includes the two tubes at the left (as viewed in Fig. 1) of the lower roof row, Bank E comprises the upper roof row consisting of twenty-four tubes. The tubes of banks C, D, and E are preferably supported at the ends by hangers 21 and one or more of such hangers may be placed intermediate the ends of the tubes, if desired.

Bank F is the lower bank in the passage 16, consisting of nine tubes in parallel, and eight in series.

Bank G consists of the upper bank in the passage 16 and includes nine tubes in parallel, and eleven in series.

Fig. 3 is a diagrammatic view showing the various oil tubes with the connections and valves. There are sixteen valves numbered respectively from 101 to 116 inclusive.

As shown in Fig. 3, 22 and 22ª indicate steam supply pipes. The pipe 22ª is adapted to receive steam from a suitable source and inject the same through suitable mixing connections or nozzles 23 into the oil pipes 24 entering bank G. If the still is used in another way, the steam enters through pipe 22, passes through tubes F, D and E to be superheated and then enters bank G.

For the purpose of illustration, I have shown two ways of using the still which, for convenience, I shall refer to as Case 1 and Case 2. The setting of the valves for these two cases can readily be seen by the following table, O indicating open and C, closed.

| Valve | 101 | 102 | 103 | 104 | 105 | 106 | 107 | 108 | 109 | 110 | 111 | 112 | 113 | 114 | 115 | 116 |
|---|---|---|---|---|---|---|---|---|---|---|---|---|---|---|---|---|
| Case 1 | O | C | C | O | O | O | O | C | O | O | O | O | C | C | C | O |
| Case 2 | C | O | O | C | C | C | C | O | C | C | C | C | O | O | O | C |

In Case 1 (see Fig. 4) the oil may be withdrawn, for example, from a still 25 by means of a pump 26 and pumped through banks A, B, C and G in the order named. Steam is introduced through pipe 22 through banks F, D and E in the order named to superheat it and it then enters the oil pipes 24 and mixes with the oil entering bank G. In this case the steam flows through the tubes of bank D in parallel and through the twenty-four tubes of bank E, three in parallel, and eight in series.

In Case 2 as shown in Fig. 5, the oil likewise may be withdrawn from a still 25 by means of a pump 26. In this case the oil is forced through banks F, A, B, C, D, E, G in the order named, and steam is introduced in the pipe 22ᵃ to mix with the oil entering the bank G through the pipes 24. In this case the oil flows through the two tubes of bank D in series, and through the twenty-four tubes of bank E in series.

By preponderatingly series flow, I mean the type of flow in which the tubes in a given tube bank are connected in such manner that the main flow through the bank of tubes is in series even though two or more of the individual tubes may be connected in parallel units which are in series, as well as the type in which each of the tubes in the bank is connected in series.

While I have shown and described certain embodiments of my invention, it is to be understood that it is capable of many modifications. Changes, therefore, in the construction and arrangement may be made without departing from the spirit and scope of the invention disclosed in the appended claims, in which it is my intention to claim all novelty in my invention as broadly as possible in view of the prior art.

What I claim is new, and desire to secure by Letters Patent, is:

1. An oil pipe heater comprising a walled rectangular combustion chamber, a fuel burner disposed through an opening in one vertical wall of the chamber above and closer to the bottom than to the top thereof, a plurality of substantially horizontally disposed banks of tubes disposed adjacent the interior boundaries in said chamber including a bank of tubes extending across and adjacent the bottom thereof and below the center line of flame from said burner, and connections between said tube banks the said tubes in said banks being unshielded and being connected in series thereby permitting the oil to be passed through said tubes in a continuous stream.

2. An oil pipe heater comprising a walled rectangular combustion chamber, means for burning fuel within said chamber above the bottom yet in close proximity thereto, a plurality of unshielded banks of oil conducting tubes within said chamber, and disposed substantially horizontally adjacent the roof and walls of said combustion chamber, a bank of tubes extending over a portion of and adjacent the bottom of said chamber and below the center line of the flame from said burning means, series connections between said tubes of each bank and series connections between said tube banks.

3. An oil pipe heater comprising a walled rectangular chamber, means dividing said chamber into a radiant section and a convection section, said sections intercommunicating with one another for passage of combustion gases over said dividing means, means for burning fuel within said radiant section, a bank of oil conducting tubes within said radiant section extending over a portion of and adjacent the bottom of said radiant section, a bank of oil conducting tubes in said convection section, and means connecting the said banks in series, the tubes in each bank being substantially horizontally disposed and the individual tubes in the radiant section being both unshielded and connected in series.

4. In an oil pipe heater comprising a walled substantially cubical combustion chamber, a burner in said chamber and a convection chamber disposed adjacent to said combustion chamber and in partial communication therewith although separated therefrom by a bridge wall for passage of combustion products from said combustion chamber over the bridge wall and through said convection chamber, with banks of oil tubes in the path of the combustion products in said convection chamber and banks of oil tubes disposed adjacent a wall and the roof of said combustion chamber, the improvement comprising, a bank of oil tubes disposed adjacent the floor of said combustion chamber and exposed to the direct radiant heat of the flame from said burner, means connecting the said banks in series, the individual tubes in the radiant section being both unshielded and connected in series.

5. A furnace for heating hydrocarbon fluids to elevated temperatures comprising, in combination, a radiant heat zone, a plurality of oil-conducting tubes disposed adjacent the floor of said zone, a convection heat zone in partial communication with said radiant heat zone, a plurality of oil-conducting convection heat tubes disposed within said convection heat zone, and a plurality of oil-conducting radiant heat tubes disposed adjacent the roof and walls of said radiant heat zone, the individual tubes in each of said banks being disposed substantially horizontally, the said banks being connected in series, and the individual tubes in each bank in the radiant heat zone being connected in series.

6. A furnace for heating hydrocarbon fluids to elevated temperatures comprising a radiant heating section having walls, a roof and a floor, a convection heating section, a bridge wall separating said radiant heating section from said convection heating zone, means for producing hot products of combustion in said radiant heating section for passage through said radiant heating section to said convection heating section, heat absorbing tubes in said convection heating section, other heat absorbing tubes in said radiant heating section disposed adjacent the roof thereof and above the point of passage of said hot products of combustion from the radiant heating section over said bridge wall and to the convection heating section, floor tubes disposed adjacent the floor of said radiant heating section and below the point of introduction of the said hot products of combustion into said radiant heating section with substantially all of said floor tubes being exposed directly to radiation from said hot products of combustion and means for connecting said aforementioned tubes for passage of oil therethrough successively and in a substantially continuous stream.

7. A furnace for heating hydrocarbon fluids to elevated temperatures comprising a radiant heating section having walls, a roof and a floor, a convection heating section, a bridge wall separating said radiant heating section from said convection heating section, means for producing hot products of combustion for passage through said radiant heating section to said convection heating section, heat absorbing tubes in said convection heating section, other heat absorbing tubes in said radiant heating section disposed above the point of introduction of the said hot products of combustion into said radiant heating section, floor tubes disposed adjacent the floor of said radiant heating section and below the point of introduction of the said hot products of combustion into said radiant heating section, with substantially all of said floor tubes being exposed directly to radiation from said hot products of combustion, and means for connecting said aforementioned tubes for passage of oil therethrough successively, the said heat absorbing tubes other than those in said convection heating section being connected in series, being disposed substantially horizontally and being connected to permit the oil to flow in a substantially continuous stream through said tubes.

8. A furnace for heating hydrocarbon fluids to elevated temperatures in accordance with claim 7 and in which heat absorbing tubes are disposed along and adjacent to at least one of the walls of the radiant heating section.

9. A furnace for heating hydrocarbon fluids to elevated temperatures in accordance with claim 7 and in which an ash pit is disposed below the floor of said radiant heating section and below the said floor tubes.

10. In a furnace for heating hydrocarbon fluids to elevated temperatures, a substantially rectangular housing having therein a substantially cubical combustion chamber, a burner located in and discharging through a side wall of said furnace, an ash pit below and communicating with the bottom of said combustion chamber and a bank of oil conducting tubes unshielded from the flame from said burner and located in said combustion chamber adjacent the bottom thereof and directly above said ash pit, at least one other bank of oil conducting tubes unshielded from the flame from said burner and located in said combustion chamber, the tubes in said banks being substantially horizontally disposed, the said banks being connected in series for the passage of oil therethrough in a continuous stream and the tubes in each bank being connected for preponderatingly series flow through the bank.

11. Oil heating apparatus comprising a substantially cubical heating chamber traversed by hot gases or products of combustion discharged from at least one burner located in a vertical wall of said heating chamber and between the bottom and the top thereof, a bank of oil conducting tubes, disposed within said heating chamber and adjacent the roof thereof, and absorbing heat by radiation and convection, and a bank of floor tubes connected to said bank of roof tubes and disposed at a level below the point of introduction of said hot gases or products of combustion for absorbing heat directly by radiation from said hot gases, the individual tubes in each of said banks being substantially horizontally disposed, the banks being connected in series and the tubes in each bank being connected for preponderatingly series flow through the bank.

12. Oil heating apparatus comprising a substantially cubical heating chamber traversed by hot gases or products of combustion discharged from at least one burner located in a vertical wall of said heating chamber and between the bottom and the top thereof, a bank of oil conducting tubes, disposed within said heating chamber and adjacent the roof thereof, and a bank of floor tubes connected to said bank of roof tubes and disposed at a level below the point of introduction of said hot gases or products of combustion for absorbing heat directly by radiation from said hot gases, at least one other bank of tubes disposed within and adjacent a side wall of the said heating chamber and connected to said bank of roof tubes and said bank of floor tubes, the individual tubes in each of said banks being disposed substantially horizontally and the banks being connected in series.

13. A tube still for heating oil comprising a furnace having a combustion chamber therein, a burner located in and discharging through a side wall of said combustion chamber, means adjacent the top of said combustion chamber for withdrawing hot gases therefrom, a bank of horizontally disposed exposed tubes supported substantially throughout its entire length below said burner, and a second bank of horizontally disposed exposed tubes disposed above said burner and above said first-named bank of tubes, said burner being adapted for projecting a flame substantially horizontally between said banks of tubes, both tube banks being unshielded from the flame so projected and heated by radiation therefrom and being connected for flow of the oil through all of the tubes of one of said banks before flowing through the tubes of the other of said banks, the tubes in each bank being connected for preponderatingly series flow through the bank.

14. In a pipe still; a housing having therein a combustion chamber and a passage for the products of combustion; a plurality of banks of tubes in said combustion chamber and in said passage; pipe connections between said banks of tubes; steam pipes entering the pipes leading to a bank in the passage; and valves controlling said connections whereby oil may be caused to flow through a bank in the combustion chamber and then through a bank in the passage and steam introduced into the oil upon entering the bank in the passage; or oil caused to flow through a bank in the combustion chamber thence through a bank in the passage, and steam caused to flow first through a bank in the combustion chamber to be superheated and thence mixed with oil upon entering a bank in the passage.

15. In a pipe still; a housing having therein a combustion chamber and a passage for the products of combustion; a bank of oil tubes in said combustion chamber at the bottom thereof; a bank of oil tubes in said combustion chamber adjacent the side walls thereof; a bank of oil tubes in said combustion chamber adjacent the roof thereof; another bank of tubes in the combustion chamber adjacent the roof thereof for oil or steam; a bank of tubes in said passage for oil or steam; a bank of tubes in said passage for mixed oil and steam; pipe connections between said banks; and valves controlling said connections whereby oil may be caused to flow through all of said banks and steam mixed therewith in passing through said last mentioned bank, or oil caused to flow through some of said banks and steam caused to flow through some of said banks to be superheated and the oil and superheated steam mixed and caused to flow together through the bank in the passage for mixed oil and steam.

16. In a pipe still; a housing having therein a combustion chamber and a passage for the products of combustion; a bank of tubes in the combustion chamber for oil or steam; a bank of tubes in the passage for mixed oil and steam; pipe connections between said banks; and valves controlling said connections whereby oil may be caused to flow through both of said banks and steam mixed therewith in passing through said last-mentioned bank, or steam caused to flow through the bank in the combustion chamber to be superheated and oil and superheated steam mixed and caused to flow together through the bank in the passage.

17. The method of heating petroleum, which comprises introducing hot combustion gases in a substantially horizontal direction into a combustion chamber, and flowing the said hot gases upwardly through the chamber, in a zone of said chamber applying heat of said gases to the petroleum by convection and radiation, and in said chamber, in a zone below the point of introduction of said hot gases and outside the preponderant flow of said gases, applying heat of the gases to the petroleum by radiation directly from the gases.

18. The method of heating petroleum, which comprises introducing hot combustion gases in a substantially horizontal direction into a combustion chamber, and flowing the said hot gases upwardly through the chamber, in a zone of said chamber applying heat of said gases to the petroleum by convection and radiation, and in said chamber, in a zone below the point of introduction of said hot gases and outside the preponderant flow of said gases, applying heat of the gases to the petroleum by radiation directly from the gases, withdrawing said hot gases from said combustion chamber and introducing them into a second chamber and in said second chamber applying heat of the gases to the petroleum by convection.

19. The method of heating petroleum in which the petroleum while being heated is in a confined and moving stream, which comprises introducing hot combustion gases in a substantially horizontal direction into a combustion chamber, and flowing the said hot gases upwardly through the chamber, in a zone of said chamber applying heat of said gases to the petroleum by convection and radiation, and in said chamber, in a zone below the point of introduction of said hot gases and outside the preponderant flow of said gases, applying heat of the gases to the petroleum by radiation directly from the gases.

20. The method of heating petroleum in which the petroleum while being heated is in a confined and moving stream, which comprises introducing hot combustion gases in a substantially horizontal direction into a combustion chamber, and flowing the said hot gases upwardly through the chamber, in a zone of said chamber applying heat of said gases to the petroleum by convection and radiation, and in said chamber, in a zone below the point of introduction of said hot gases and outside the preponderant flow of said gases, applying heat of the gases to the petroleum by radiation directly from the gases, withdrawing said hot gases from said combustion chamber and introducing them into a second chamber and in said second chamber applying heat of the gases to the petroleum by convection.

GEORGE W. WATTS.